US006155583A

United States Patent [19]
Koike

[11] Patent Number: 6,155,583
[45] Date of Patent: Dec. 5, 2000

[54] WHEELCHAIR

[76] Inventor: Shozo Koike, 27-2 Wada 3-chome, Suginami-ku, Tokyo, Japan

[21] Appl. No.: 09/221,580

[22] Filed: Dec. 29, 1998

[30] Foreign Application Priority Data

| | | | |
|---|---|---|---|
| Jan. 14, 1998 | [JP] | Japan | 10-017722 |
| Feb. 9, 1998 | [JP] | Japan | 10-078233 |
| Jun. 1, 1998 | [JP] | Japan | 10-189591 |

[51] Int. Cl.$^{7}$ .............................. B62M 1/14; A61G 7/08

[52] U.S. Cl. .............................. 280/250.1; 280/304.1; 297/DIG. 4; 5/81.1 HS

[58] Field of Search .............................. 280/250.1, 242.1, 280/233, 244, 253, 304.1, 226.1, 43; 180/330, 907; 297/DIG. 4; 5/86.1, 81.1 HS

[56] References Cited

U.S. PATENT DOCUMENTS

| | | | |
|---|---|---|---|
| 1,635,575 | 7/1927 | Cole | 5/81.1 HS |
| 2,869,614 | 1/1959 | Wamsley | 297/DIG. 4 |
| 3,381,973 | 5/1968 | Carr | 280/250.1 |
| 3,882,949 | 5/1975 | Anderson | 180/907 |
| 3,952,822 | 4/1976 | Udden et al. | 297/DIG. 4 |
| 4,266,305 | 5/1981 | Kavoloski et al. . | |
| 4,453,732 | 6/1984 | Assanah et al. | 280/250.1 |
| 4,457,528 | 7/1984 | Ichikawa et al. | 280/250.1 |
| 4,679,259 | 7/1987 | DiMatteo et al. | 297/DIG. 4 |
| 4,997,200 | 3/1991 | Earls . | |
| 5,050,899 | 9/1991 | Stensby | 297/DIG. 4 |
| 5,193,633 | 3/1993 | Ezenwa . | |
| 5,333,887 | 8/1994 | Luther | 280/250.1 |
| 5,373,591 | 12/1994 | Myers . | |
| 5,423,562 | 6/1995 | Pearce, Jr. | 280/250.1 |
| 5,590,893 | 1/1997 | Robinson et al. | 280/250.1 |
| 5,613,697 | 3/1997 | Johnson | 280/250.1 |
| 5,669,620 | 9/1997 | Robbins | 280/250.1 |
| 5,884,929 | 3/1999 | Kincaid | 280/250.1 |
| 5,896,602 | 4/1999 | Marblestone | 5/86.1 |

FOREIGN PATENT DOCUMENTS

| | | | |
|---|---|---|---|
| 06315506 | 11/1994 | Japan | 280/250.1 |

*Primary Examiner*—J. J. Swann
*Assistant Examiner*—Christopher D. Bottorff
*Attorney, Agent, or Firm*—Arent Fox Kintner Plotkin & Kahn, PLLC

[57] ABSTRACT

A wheelchair which enables the user on the wheelchair to remove or reinstall larger diameter wheels without jacking up the entire structure. The wheelchair includes a seat, legs supporting the seat, a caster having a holder and a smaller diameter wheel rotatably installed at a center of the bottom surface of each of the respective legs, axle supporting levers reclinably mounted on both sides of the seat and a wheel axle for the respective larger diameter wheel, one end of which is removably installed on one end of the respective axle supporting lever. The other end of the axle supporting lever functions as a handle for reclining the lever. The diameter of the larger diameter wheel is larger than the diameter of the smaller diameter wheel.

5 Claims, 7 Drawing Sheets

WHEELCHAIR

BACKGROUND OF THE INVENTION

This invention relates to an improved wheelchair and more specifically, a wheelchair wherein a user can readily switch between use of large diameter wheels and use of small diameter wheels to facilitate movement in different situations.

Larger diameter wheels of the wheelchair, which are installed at both sides of the wheelchair, are designed to provide a smooth outdoor or indoor movement and to enable the users to transport themselves.

However, because of its larger diameter, the user having a wheelchair with conventional wheels has difficulty in moving in a narrower passage especially inside a housing, building, etc. Further, because of the larger diameter, the user having a wheelchair with conventional wheels has difficulty in approaching a target place, e.g. a table, sufficiently close enough to conduct an intended act.

In order to circumvent the above identified problems, conventionally, smaller diameter wheels are installed on legs of the wheelchair, and the larger diameter wheels are removably and reinstallably installed on the seat.

However, the larger diameter wheels of the conventional wheelchair require the entire chair to be jacked up when removing or reinstalling them. Further, the wheels need to be changed manually.

OBJECTS OF THE INVENTION

This invention has as an object to resolve the above-identified problems. More specifically, an object of this invention is to provide a wheelchair which enables the user on the wheelchair to remove or reinstall the larger diameter wheels without jacking up the entire chair.

To achieve the above objective, this invention comprises a seat and legs supporting the seat, which further comprises a caster including a holder and a smaller diameter wheel rotatably installed at a center of the bottom surface of each respective leg, axle supporting levers reclinably mounted on both sides of the seat by connecting means, and a wheel axle for each respective larger diameter wheel, one side of which is removably installed at one end of one of the respective axle supporting levers, wherein the other end of each axle supporting lever functions as a handle for reclining the lever, and the diameter of each larger diameter wheel is larger than the diameter of the smaller diameter wheel.

The invention further is a wheelchair as above, wherein the axle supporting levers are reclinable to a position parallel to a plane of the seat.

The invention still further is a wheelchair as above, wherein the axle supporting levers are removable from the seat.

The invention still further is a wheelchair, wherein the seat includes a guiding frame and a sliding seat board which is slidable on the guiding frame, connecting means are used to connect the guiding frame and a back frame. The sliding seat board is slidable onto the back frame when the back frame is reclined.

This invention still further is a wheelchair as above, wherein a transfer frame is removably and reconnectably connected with the back frame.

This invention yet further is a wheelchair, wherein the seat includes a guiding frame and a sliding seat board slidable on the guiding frame with a turn table being rotatably provided on the sliding seat board having an opening in the center of the turn table.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
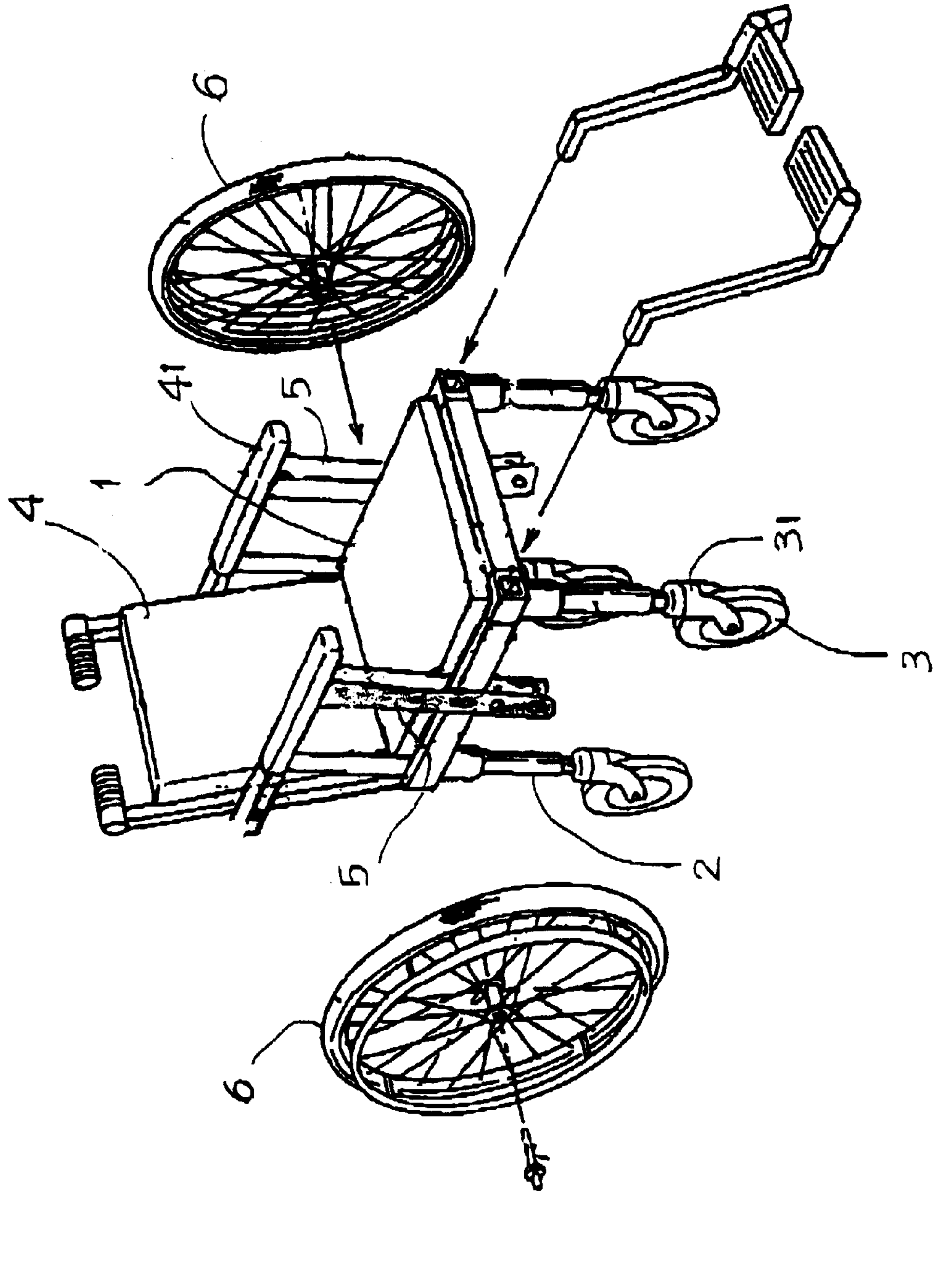
FIG. 1 is a perspective, partially exploded view of a first embodiment of the wheelchair of this invention.
Figure 2:
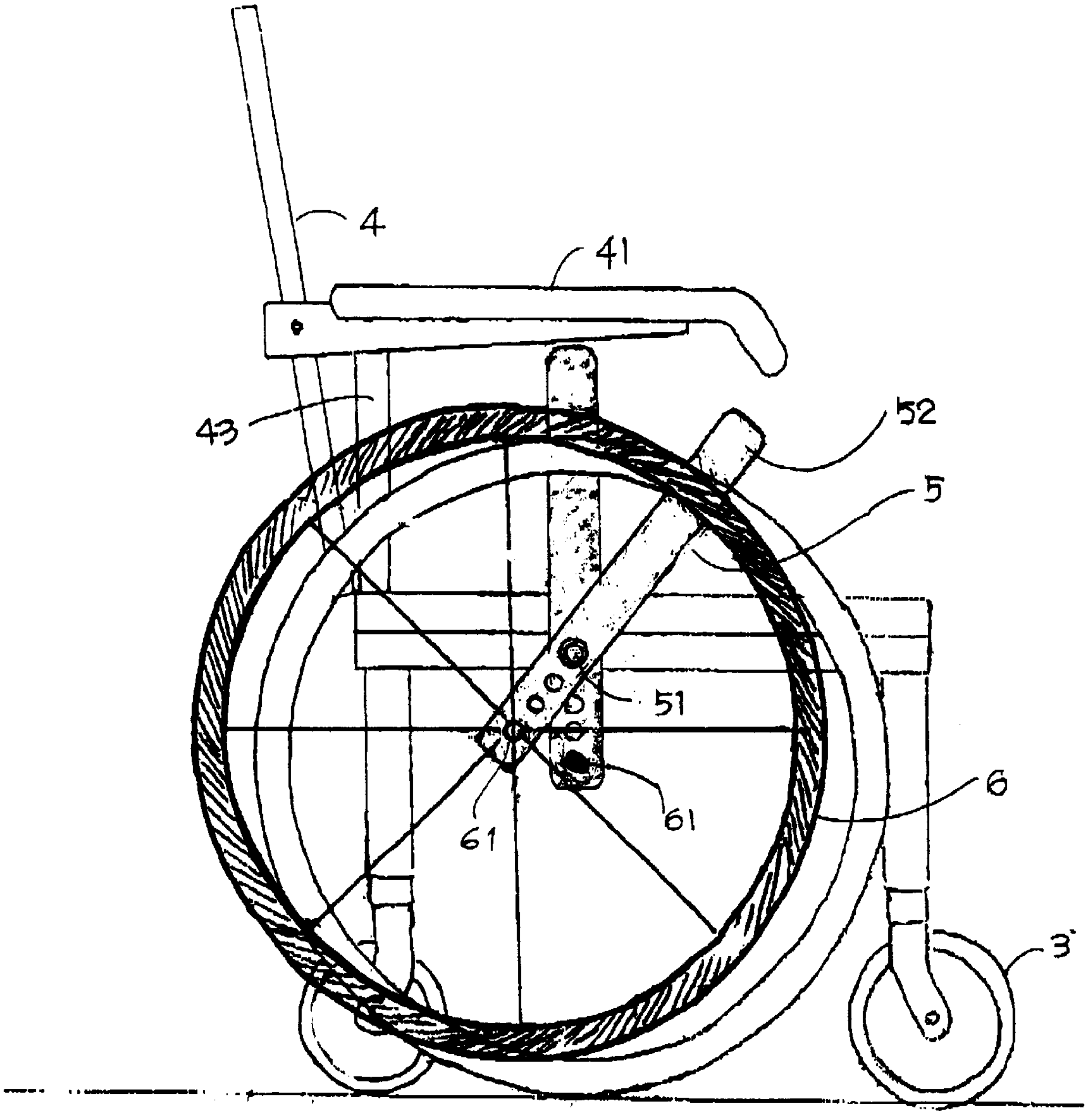
FIG. 2 is a side view of this invention with alternate positions shown for the lever.

A wheelchair of this embodiment mainly comprises a seat 1 and four legs 2 supporting the seat 1. A caster 31 including a holder and a smaller diameter wheel 3 is installed at the respective lower end of each of the legs 2. The caster 31 is rotatable with a pivot point at the center of the bottom surface of the leg 2. For example, the leg 2 may be extendible by using two pipes, where one smaller diameter pipe is telescopically slidably fitted into a larger diameter pipe and a stopper, such as a pin, is used to changeably fix the relationship between the two pipes.

A back frame 4 may be connected with the seat 1. The back frame 4 may be reclinable by connecting means, e.g. pins in this embodiment, which may connect a guiding frame 11 and the back frame 4. Armrests 41 at both sides of the back frame 4 may be adapted to be reclinable by another connecting means. Accordingly, the armrest 41 may be rotated up parallel to the back frame 4 with a pivot point at the another connecting means.

Larger diameter wheels 6 are removably installed on the wheelchair. The diameter of the larger diameter wheel 6 is designed to be larger than the diameter of the smaller diameter wheel 3. For the installation of the larger diameter wheels, the connecting means 51 such as pins and bolts are used to pivotally attach axle supporting levers 5 at both sides of the seat 1 to support the larger diameter wheels 6.

A plural number of holes are formed on each respective axle supporting lever 5. The holes are to be formed in a lower portion of the lever at positions longitudinally away from the connecting means 51. A wheel axle 61 for the larger diameter wheel 6 is removably installed in one of the holes. The upper portion of the axle supporting lever 5 functions as a handle 52 to rotate the axle supporting lever 5. The upper end of the axle supporting lever 5 may be fixed to the respective horizontal armrest by connecting means such as fasteners so that it may easily be removed when necessary.

In order to remove the larger diameter wheels 6, the handles 52 of the axle supporting levers 5 are pulled or pushed. The axle supporting levers 5 rotate with the pivot point at the center of the connecting means 51. The wheel axles 61 mounted on the lower portions of the axle supporting levers 5 swing forward or backward. The wheelchair load is thus smoothly shifted to the smaller diameter wheels 3, and the larger diameter wheels 6 are set free and can be removed. Accordingly, the wheel axles 61 are pulled to remove the wheels. The wheel axle 6 of this embodiment is a pin type; however, any other conventional removable wheel axle may be used.

When shifting the load, pushing the handles 52 down moves the wheelchair forward slightly. Therefore, shifting the load may be conducted without a rapid vertical movement or movement impact to a user. The slight movement absorbs uncomfortable feeling also. If there is no movement and the load is shifted to the same position, the user would feel the rapid vertical movement or movement impact.

When installing the larger diameter wheels 6 on the axle supporting levers 5, the wheel axles 61 for the larger diameter wheels 6 are installed on the axle supporting levers 5. The handles 52 are pulled to rotate the axle supporting levers 5 while sitting on the wheelchair, thereby shifting the wheelchair load from the smaller diameter wheels 3 to the larger diameter wheels 6 smoothly. In this case, the wheelchair also slightly moves backward, thereby eliminating the rapid vertical movement or movement impact. Accordingly, this invention does not require any unnecessary efforts to lift the entire wheelchair and enables shifting of the wheelchair load without giving an uncomfortable feeling.

Figure 4:
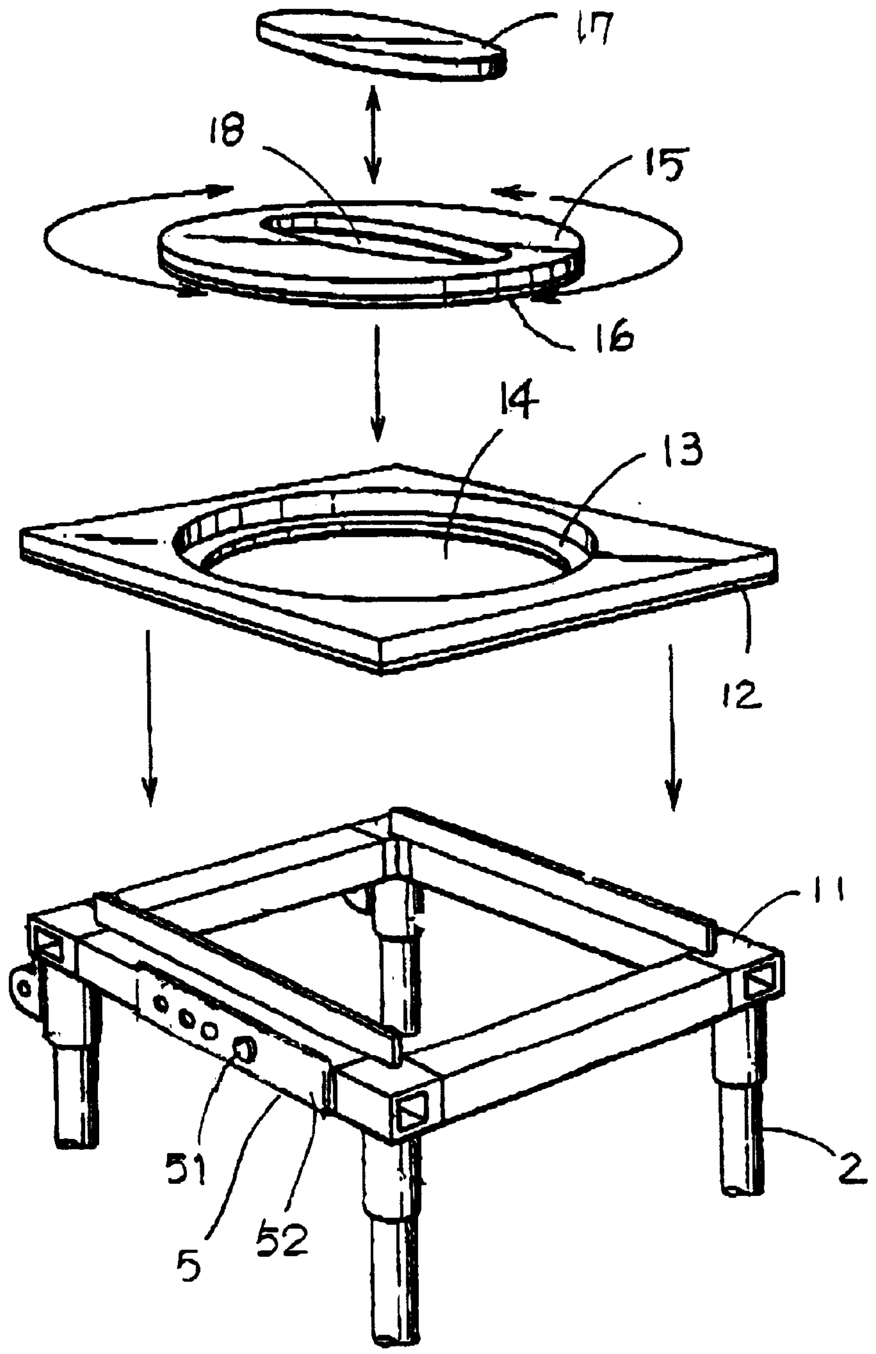
FIG. 4 is a perspective, partially exploded view of an embodiment of the seat board and the turn table.

As shown in FIG. 4, when the axle supporting levers 5 are rotated with the pivot point at the central region of the connecting means, the levers 5 are designed to become parallel to a plane including the guiding frame 11. Rotating the axle supporting levers 5 to be parallel to the guiding frame 11, no obstacle exists below the seat 1 other than the four legs 2 to prevent the seat 1 from being transferred above a toilet stool, etc.

Alternatively, instead of rotating the axle supporting levers 5 to be horizontal, the axle supporting levers 5 may be designed to be detached from or attached to the seat 1 by unfastening or fastening bolts. In brief, the axle supporting levers 5 function to attain the object of this invention at least if the axle supporting levers 5 do not become an obstacle in the space under the seat 1.

To pass above a toilet stool with a maximum amount of space under the seat 1, the axle supporting levers 5 could be an obstacle and may not be necessary. In such a case, instead of the axle supporting levers 5, wheels may be directly installed on the side surface of the seat 1 or on the legs 2. In those ways, the bottom ends of the axle supporting levers 5 would not be exposed under the seat 1.

However, in the above cases without the axle supporting levers, the radius of the larger wheel 6 becomes equal to the distance between the floor and the connecting means 51, and therefore much larger diameter wheels may be necessary to be used. If much larger diameter wheels are installed, one half of the wheel is exposed outside, which creates many problems in approaching a table, passing through a narrow passage, etc.

With respect to the wheelchair of this invention, the radius of the larger diameter wheel 6 is equal to the distance between the floor and the point on the axle supporting lever 5 where the wheel axle 61 is installed. As a result, the wheel diameter can be decreased remarkably. The portion of the larger diameter wheel 6 exposed from the leg 2 can be reduced, thereby expanding the area within which the wheelchair can move. Accordingly, in order to reduce the diameter of the larger diameter wheel 6, the axle supporting lever is necessary.

Designing the diameter of the larger diameter wheel 6 to be smaller facilitates movement of the wheelchair and reduces the approach distance to an object as described above. However, designing the wheel 6 smaller makes the entire wheelchair smaller.

Designing the larger diameter wheel 6 larger, the larger diameter wheels 6 become obstacles and prevent a smooth rotation of the smaller diameter wheels 3 installed under the legs 2 and a smooth turning of the legs with the smaller diameter wheels 3. In order to avoid this problem, the distance between the smaller diameter wheels 3 may be extended. However, if the distance is extended, the length of the seat 1 becomes larger, and the movement in a small space or at a corner would be very difficult. Especially, entering or exiting the toilet would be very difficult.

Accordingly, by enlarging the diameter of the larger diameter wheel 6, the entire wheelchair size is also too much enlarged, which can limit the use of the chair.

There is an opening at the central region of the seat 1. The seat 1 may be divided into the guiding frame 11 and a sliding seat board 12 slidably mounted on the guiding frame 11. The center of the sliding seat board 12 is opened for easing nature, and a lid covering the opening is provided when not in use.

Figure 3:
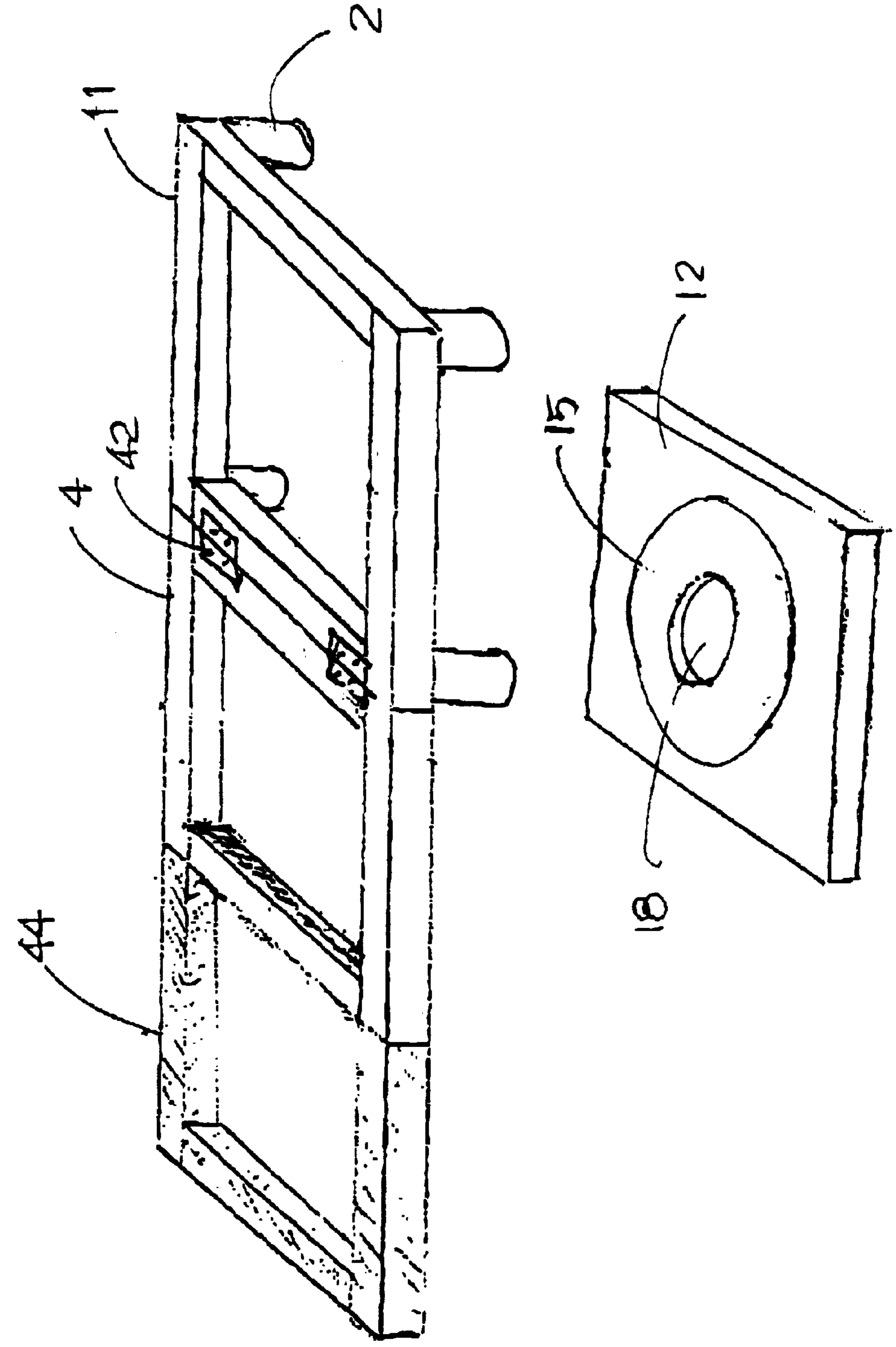
FIG. 3 is a perspective view of the back frame and the slidable seat board.

As shown in FIG. 3, the guiding frame 11 of the seat 1 is reclinably connected to the back frame 4 by a connecting part 42 such as hinges. The back frame 4 can be fixed on the strut 43, which is fixed on the seat 1, in a predetermined angle by a connecting part such as a bolt. When the back frame 4 is released from the strut 43, the sliding seat board 12 can slide onto the back frame. Further, a transfer frame can be removably connected to the free side of the back frame 4. When transferring the wheelchair user to another place such as to a vehicle, the transfer frame 44 which is connected to the back frame 4 is mounted on the vehicle seat and the user is transferred to the vehicle seat with the transfer board 44. The sliding seat board 12 and the transfer frame 44 are left on the vehicle seat. When the user exits from the vehicle, one side of the transfer board 44 inside vehicle is connected with the back frame 4, the sliding seat board is moved and the board 44 is transferred with the wheelchair. The transfer board is then removed and the back frame raised. The same processes may be used when transferring the user to and from a bed.

As explained above, the sliding seat board 12 is slidably mounted on the guiding frame 11; however, a publicly known lock mechanism may be used to restrict the slide.

As shown in FIG. 4, a circular hole 14 can be opened in the center of the sliding seat board 12. A stepped surface 13 is formed on the inner circumference of the circular hole 14. A turn table 15 is fitted inside the circular hole 14.

The outer diameter of the turn table 15 is almost equal to the inner diameter of the circular hole 14. The turn table 15 is designed to be rotatable on the stepped surface 13. In addition, to facilitate the rotation of the turn table 15, a material 16 having a low coefficient of friction and formed into a shape such as a ring, roller, etc. is placed between the turn table 15 and the stepped surface 13.

An outlet 18 is formed on the center of the turn table 15 and functions as a toilet seat. Over the outlet 18, a lid 17 can be removably placed. Cushioning material is provided on the lid 17. When the lid 17 is drawn out from the side, the cushioning material may be removed and the outlet 18 would be exposed by slightly rising oneself from the seat without getting out from the chair.

In use, when a user is approaching the toilet where the door is facing the stool, the larger diameter wheels 6 are removed; the chair is moved backward while sitting on the seat without the lid 17; and the chair continues to move until it is positioned above the stool. Accordingly, the wheelchair is placed in the position over the stool.

However, when approaching the toilet where the door is facing the side of the stool and when the wheelchair is moving sideways, especially in a typical Japanese size toilet, portions of the legs under the knees of the user become obstacles against the post and prevent from moving into the toilet.

Figure 5:
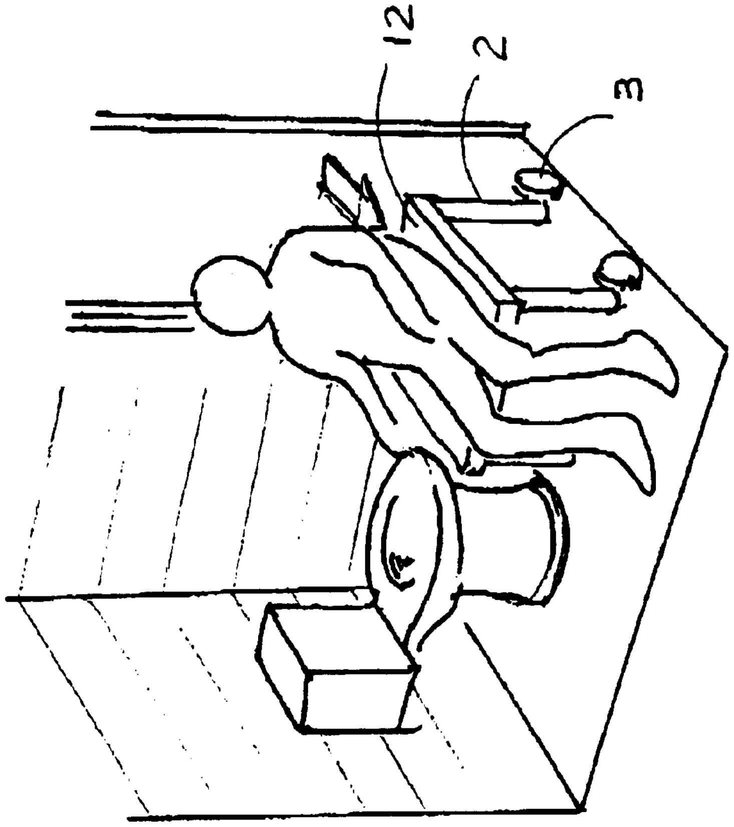
FIG. 5 is a first operational explanation view of use of the invention at an American type toilet stool.
Figure 6:
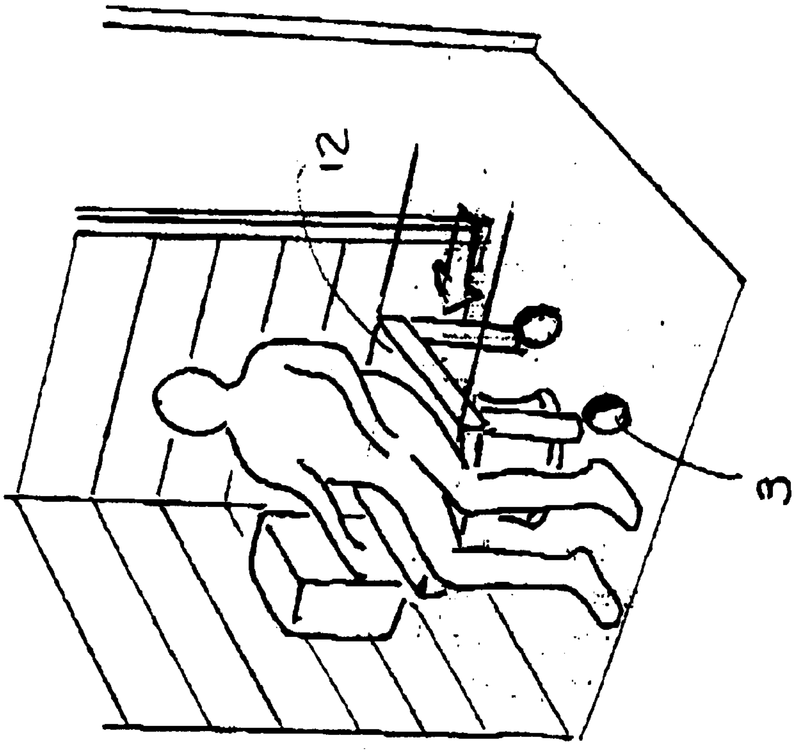
FIG. 6 is a second operational explanation view of use of the invention at an American type toilet stool.
Figure 7:
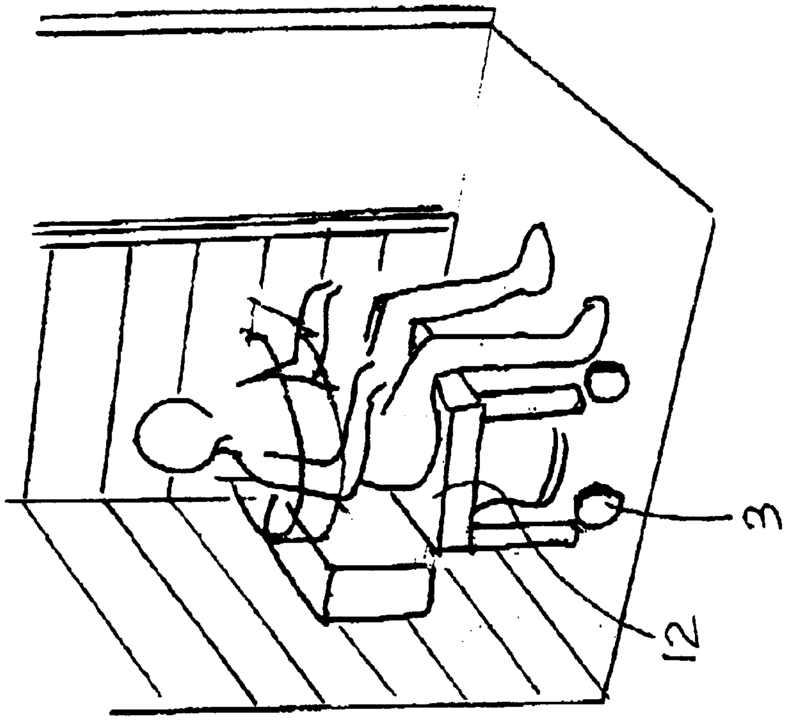
FIG. 7 is a third operational explanation view of use of the invention at an American type toilet stool.

In the wheelchair of this invention, however, the user may be able to move into the toilet in the forward-directed position as shown in FIG. 5. Then, the wheelchair moves sideways where the stool is being located on the side as shown in FIG. 6. Finally, the turn table 15 is rotated to situate the user in the appropriate position as shown in FIG. 7, and the user may attain the objective using the outlet 18.

Further, as necessary, the back frame 4 and the armrest may be removed. When leaving the toilet, the turn table 15 is rotated and the user follows the processes opposite to when getting into the toilet.

Since the wheelchair of this invention has the above-described characteristics, this invention has the following advantages:

By tilting the axle supporting lever 5, the larger diameter wheel 6 may be installed at or removed from the lower part of the axle supporting lever 5. Accordingly, the user of the wheelchair of this invention, without help from another, is able to choose and switch to move around in a large space with the larger diameter wheels 6, to move in a small space with the smaller diameter wheels 3, or to closely approach an object such as a table.

When reclining the axle supporting lever 5, the wheelchair slightly moves whereupon the user does not feel a rapid vertical movement or movement impact when the entire wheelchair load is shifted, which absorbs an uncomfortable feeling to the user. Accordingly, the wheelchair of this invention provides a smooth shifting of the load with the weight of the user from the larger diameter wheels 6 to the smaller diameter wheels 3 or vice versa.

By reclining or removing the axle supporting lever 5, this invention does not leave any obstacle under the seat. Accordingly, the wheelchair may move directly above the stool and enables for the user to ease nature while sitting on the wheelchair.

The back frame 4 of the wheelchair may be utilized as a rail for the sliding seat board 12. Therefore, transferring to another place such as a vehicle or bed may be conducted without much help from another.

The wheel axle of the larger diameter wheel 6 is set on the lower part of the axle supporting lever, and the diameter of the larger diameter wheel 6 is equal to the distance between the floor and the point on the axle supporting lever where the wheel axle 61 is set. Compared to the conventional wheelchair in which the larger diameter wheel is directly installed on the seat without the axle supporting lever, this invention enables a reduction in the size of the diameter of the larger diameter wheel.

Further, this invention eliminates the case that the smaller diameter wheels 3 at the lower ends of the legs 2 become an obstacle. Therefore, the interval between the smaller diameter wheels 3 may be reduced, and the depth may be shortened, thereby providing various uses by facilitating the movement in a narrow passage, or at a corner, or in a small room, especially entering and exiting a toilet.

When approaching the toilet where the door is facing the side of the stool and when the wheelchair is moving sideways, especially in a typical Japanese size toilet, portions of the legs under the knees of the user become obstacles against the post and prevent from moving into the toilet.

In the wheelchair of this invention, however, the user may be able to move into the toilet in the forward-directed position. Then, the wheelchair moves sideways where the stool is being located on the side as shown in FIG. 6. Then, the turn table 15 is rotated to situate the user in the appropriate position as shown in FIG. 7.

Accordingly, the wheelchair enables the user to ease nature while sitting on the wheelchair, and therefore no support by another is necessary to move in the toilet, thereby reducing the mental burden of the user.

It is readily apparent that the above-described has the advantage of wide commercial utility. It should be understood that the specific form of the invention herein above described is intended to be representative only, as certain modification within the scope of these teachings maybe apparent to those skilled in the art.

Accordingly, reference should be made to the following claims in determining the full scope of the invention.

What I claim is:

1. A wheelchair, comprising:

a seat, legs supporting said seat, a caster including a holder and smaller diameter wheels rotatably installed at a center of a bottom surface of each of the respective legs, axle supporting levers tiltably mounted on both sides of said seat by connecting means, and a wheel axle for a respective larger diameter wheel, one side of which is removably installed on one end of the respective axle supporting lever, wherein the other end of said axle supporting lever functions as a handle for tilting said lever, and the diameter of each said larger diameter wheel is larger than the diameter of each said smaller diameter wheel, wherein said axle supporting levers are reclinable to a position parallel to a plane of said seat.

2. A wheelchair as claimed in claim 1, wherein said axle supporting levers are removable from said seat.

3. The wheelchair according to claim 1, further comprising:

wheels supporting said seat, wherein said seat includes a guiding frame, a sliding seat board slidable on said guiding frame, a back frame, and connecting means pivotally connecting said guiding frame and said back frame to recline said back frame relative to said guiding frame, and said sliding seat board is slidable on said back frame when said back frame is reclined.

4. The wheelchair as claimed in claim 3, further comprising:

a transfer frame removably and reconnectably connected with said back frame.

5. The wheelchair according to claim 4, further comprising:

a turn table rotatably provided on said sliding seat board and having an opening formed in a center of said turn table.

* * * * *